(No Model.) 2 Sheets—Sheet 1.

J. F. McELROY.
FLOAT TRAP.

No. 586,617. Patented July 20, 1897.

Witnesses:
J. W. Fisher
Grace T. Many

Inventor,
James F. McElroy
by Ward & Cameron
Attorneys

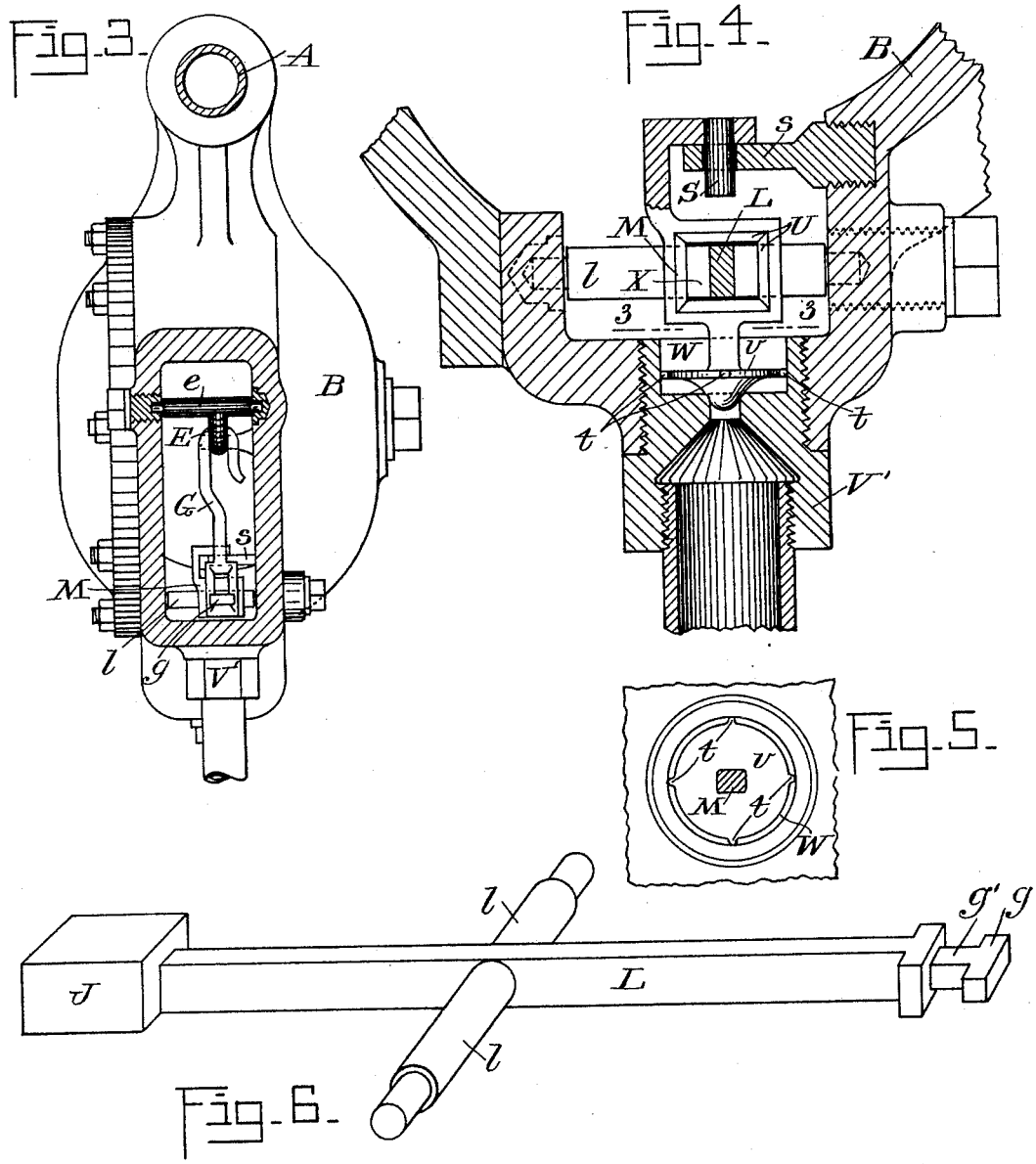

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

FLOAT-TRAP.

SPECIFICATION forming part of Letters Patent No. 586,617, dated July 20, 1897.

Application filed August 6, 1896. Serial No. 601,891. (No model.)

*To all whom it may concern:*

Be it known that I, JAMES F. MCELROY, a citizen of the United States, residing in the city and county of Albany and State of New York, have invented a new and useful Improvement in Float-Traps, of which the following is a specification.

My invention relates to devices for regulating and controlling the discharge of the water of condensation from steam-heating systems particularly adapted for use on railway-cars; and the objects of my invention are to provide a float-trap so constructed and connected that the water of condensation shall not freeze and that the mud and sedimentary deposits may be collected and may not interfere with the operation of the device, together with certain improvements in construction of float-traps hereinafter described. I obtain these objects by means of the mechanism illustrated in the accompanying drawings, in which—

Figure 1:
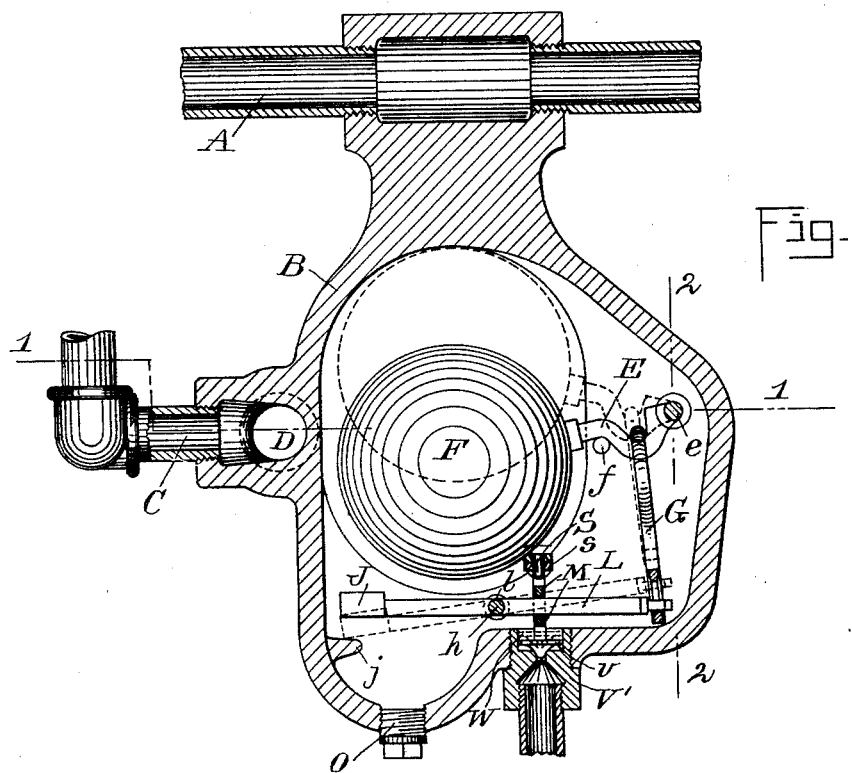
Figure 2:
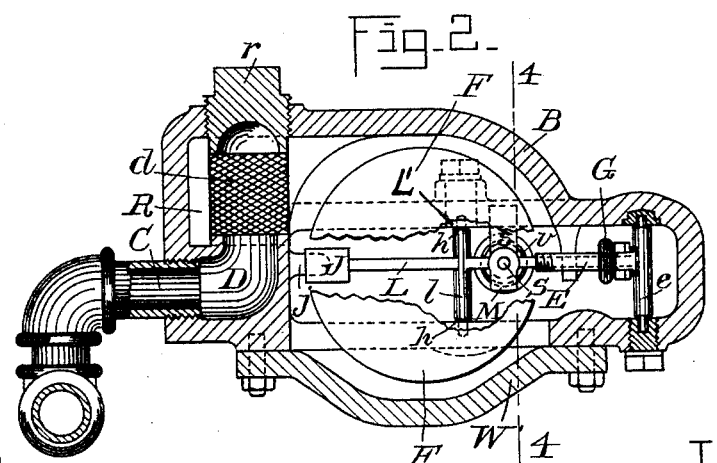

Figure 1 is a vertical section. Fig. 2 is a horizontal section along the lines of 1 1 on Fig. 1. Fig. 3 is a section along the lines 2 2 on Fig. 1. Fig. 4 is a section through the valve along the lines 4 4 on Fig. 2. Fig. 5 is a section along the lines 3 3 on Fig. 4. Fig. 6 is a detailed view of the weighted lever L.

Similar letters refer to similar parts throughout the several views.

To the steam-pipe A, usually termed "train-pipe," I secure in any convenient manner a metal trap B. This may be done by providing a threaded opening in the trap adapted to mesh with the threads on the pipe A, as shown in Fig. 1, or in any suitable manner. Trap B, being thus intimately connected with the heated pipe A, is warmed to such an extent that its contents will be above the freezing-point in extremely cold weather, although the steam is not passing through the car to which the drip-pipe C is connected.

The drip-pipe C enters the trap through an orifice D. The contents of the drip-pipe C pass first into the chamber R in the trap, which chamber R is provided with a screen $d$, the chamber being closed by a plug $r$, which may be removed, when desired, for the purpose of cleaning said chamber R of sediment deposited therein, the tendency being for the sediment to be forced from the screen into the end of the chamber R, where it collects, and it may be removed as described. The screen $d$ may be withdrawn from the chamber R through the opening in which the plug $r$ engages. This for the purpose of cleaning the screen.

Within the trap B, I mount a ball-lever E, usually by securing it to the spindle $e$, having suitable bearings in the walls of the trap, said lever E carrying the float-ball F. I usually arrange the stop $f$, consisting of a projection from the side of the trap against which the lever E will impinge when the contents of the trap are below the ball, and this acts as a support for the ball. Between the support of the lever E and the weight thereon to the ball F, I attach one end of the hook or link G. The other end of the link G is secured to the end of the lever L, with its fulcrum at $h$, and carries at its end opposite the link the weight J, which weight is limited in its movement by the projection $j$. I usually mount the lever L by securing to it a spindle $l$, tapped to engage with bearings in the sides of the trap, or in a suitable casting L', arranged therein.

The link G is attached to the end of the lever L, preferably by cutting a slot in the link, adapted to pass over the T-shaped lug $g$ on the end of the lever L, and then be turned so as to lock upon the end of the lever held in position by the elongated end of the T-shaped lug, the link occupying a position on the shank $g'$ of said lever, the lever capable of a limited movement in said slot.

Between the fulcrum $h$ and the link G the lever L engages with the stem M of the valve, passing through an opening in the valve-stem in such a manner that as the lever L moves up and down the valve-stem will be elevated or lowered. In order that the movement of the valve-stem shall be positively vertical and free from all binding tendency, I arrange a pin S in connection with the valve-stem, which passes through an opening in the arm $s$, secured to the side of the trap, which acts as a guide for the valve-stem. I construct the enlarged opening in the valve-stem through which the lever L passes preferably with beveled sides U, giving room for play, so that the movement of the valve-stem shall be free and not at all influenced by the position which it occupies on the lever L. The valve-stem may thus revolve slightly and in no case can it be caused to bind by the action of the lever. I also arrange on the disk $v$ of the valve points $t$, which engage with the sides of the opening W, within which the valve-disk is placed, and which points $t$ tend to center the valve-disk and operate with the pin S to control the movement of the valve-stem in a positively vertical direction, allowing for slight revolution.

At the lowest point of the trap below the lever L, I arrange a pocket for the collection of such sediment as may pass into the trap and place a plug O therein, which may be removed for the purpose of cleaning the pocket.

The operation of my trap is apparent. The normal position of the trap is with the valve open. The weighted lever L tends to hold it in that position. When, however, sufficient pressure is brought to bear upon the valve-disk by steam or water, the valve is closed and the water will collect until such time as the contents of the trap shall cause the ball F to rise, which will force open the valve and cause the water to escape. The hot metallic contact with the train-pipe will insure the contents of the trap from freezing.

It will be noticed that when the plug $r$ is removed, forcing steam through the discharge-pipe C, it will blow out any sedimentary deposit that may be collected in the chamber R. It will also be noticed that the trap can be opened by removing the cap W', which will disclose the interior without removing the trap from connection either with the train-pipe or the discharge-pipe. For the purposes of repairing or replacing any of the parts or cleaning it is unnecessary even to remove the cap W', since for cleaning the screen the plug $r$ furnishes an opportunity for removing the screen. If it is desired to remove the valve, the plug V, within which the valve operates, may be removed from the trap, it being simply necessary in taking out the valve-stem to lift the pin S from out the opening in the bracket $s$ and lift the disk out of the recess in the plug, which may be done either by removing the lever L from the slot X in the valve-stem or by turning the lever over on its side and drawing the valve-stem off of the lever. Of course it would be necessary to lift the link G before taking the valve-stem off of the lever L, which is done from the outside of the trap by removing the plug $g$. It will be noticed that each of the parts may be removed by taking out plugs and may be operated on from the exterior of the trap.

I make the valve-stem small in order that the pressure of steam from the discharge-pipe upon the surface shall not be so great as to prevent the ball from operating the same. This would be a dangerous innovation because of its liability to freeze were it not that I provide a hot metallic connection to the train-pipe, and with that the freezing tendency is overcome.

What I do claim as my invention, and desire to secure by Letters Patent, is—

1. In a float-trap, a casing, a train-pipe, said casing placed in metallic contact with said train-pipe, a pipe adapted to discharge its contents into a chamber in said casing, a screen in said chamber, a plug adapted to close an orifice in said chamber, said chamber communicating with the interior of said casing, a discharge-pipe from said casing, a valve in said discharge-pipe, a weighted lever arranged to hold said valve open when the trap is in its normal condition, a link adapted to lock on the end of said weighted lever, a ball-lever, said link connected with said lever, substantially as described and for the purpose set forth.

2. In a float-trap for car-heating systems, a pipe adapted to discharge the contents of said trap, a valve in said pipe, a valve-stem, guides connected with said valve-stem, so arranged that the valve and its stem may be turned within prescribed limits about the axis of said valve-stem, enabling to wear said valve evenly upon its seat, a weighted lever adapted to operate in connection with said valve-stem, so arranged that the lateral motion of the weighted lever cannot cause the binding of the valve-stem upon its bearings, a ball-lever, a hook connecting said weighted lever with said ball-lever, so arranged that the weighted lever is free to move within prescribed limits without lifting the hook connecting it to the ball-lever.

3. In a float-trap, a casing, a pipe adapted to discharge therein, a discharge-pipe from said casing, a valve in said discharge-pipe, a valve-stem provided with a pin movable in a bearing centered vertically above said valve, a valve-disk connected with said stem, a removable plug within which the valve operates, so arranged that by taking out said plug the valve may be removed from the casing, substantially as described.

4. In a float-trap, a casing, a pipe adapted to discharge therein, a discharge-pipe from said casing, a valve in said discharge-pipe, a valve-stem, a weighted lever suitably mounted, said weighted lever passing through an opening in said valve-stem, said opening enlarged, allowing for the partial revolution of said valve-stem upon said lever, a removable cap on said casing, so arranged that when the cap is taken off the weighted lever may be removed from said casing, substantially as described.

JAMES F. McELROY.

Witnesses:
CHAS. B. MITCHELL,
FREDERICK W. CAMERON.